US008888305B2

(12) United States Patent
Chen

(10) Patent No.: US 8,888,305 B2
(45) Date of Patent: Nov. 18, 2014

(54) ILLUMINATED KEYBOARD

(71) Applicant: Primax Electronics Ltd., Taipei (TW)

(72) Inventor: Chung-Yuan Chen, Taipei (TW)

(73) Assignee: Primax Electronics Ltd., Neihu (TW)

( * ) Notice: Subject to any disclaimer, the term of this patent is extended or adjusted under 35 U.S.C. 154(b) by 25 days.

(21) Appl. No.: 13/919,852

(22) Filed: Jun. 17, 2013

(65) Prior Publication Data

US 2014/0168935 A1 Jun. 19, 2014

(30) Foreign Application Priority Data

Dec. 19, 2012 (TW) .............................. 101148401 A

(51) Int. Cl.
*G01D 11/28* (2006.01)
*F21V 8/00* (2006.01)

(52) U.S. Cl.
CPC .................................. *G02B 6/0083* (2013.01)
USPC ....................... 362/23.03; 362/23.16; 200/310

(58) Field of Classification Search
USPC .............. 362/23, 24, 26, 28, 29, 30; 200/310; 438/531
See application file for complete search history.

(56) References Cited

U.S. PATENT DOCUMENTS

| 5,397,867 | A * | 3/1995 | Demeo .......................... 200/5 A |
| 6,860,612 | B2 * | 3/2005 | Chiang et al. ................... 362/29 |
| 7,608,792 | B1 * | 10/2009 | Tsai ............................... 200/310 |
| 7,712,910 | B2 * | 5/2010 | Ng et al. .......................... 362/85 |
| 7,888,613 | B2 * | 2/2011 | Jeffery et al. .................. 200/314 |
| 2007/0285947 | A1 * | 12/2007 | Kim ............................... 362/631 |
| 2008/0135392 | A1 * | 6/2008 | Huang et al. .................. 200/5 A |
| 2011/0089011 | A1 * | 4/2011 | Ozaki ............................ 200/512 |
| 2011/0272262 | A1 * | 11/2011 | Chen ............................. 200/5 A |
| 2012/0012448 | A1 * | 1/2012 | Pance et al. .................... 200/5 A |
| 2012/0182760 | A1 * | 7/2012 | Ohrui et al. .................... 362/602 |

* cited by examiner

*Primary Examiner* — Ali Alavi
(74) *Attorney, Agent, or Firm* — Kirton McConkie; Evan R. Witt

(57) ABSTRACT

An illuminated keyboard includes a light source, a key structure, and a backlight membrane switch module. The backlight membrane switch module is disposed under the key structure for generating a key signal and transferring a light beam from the light source to the key structure. The backlight membrane switch module includes a light guide plate and a membrane switch circuit board. The membrane switch circuit board is disposed over the light guide plate. Moreover, the membrane switch circuit board includes a wiring plate, a partition plate, and a light-shading part. The light-shading part is located at a side of the wiring plate or the partition plate, and bent downwardly to a position under the light guide plate in order to enclose a lateral surface of the light guide plate. Consequently, the problem of causing light leakage will be eliminated.

10 Claims, 5 Drawing Sheets

ILLUMINATED KEYBOARD

FIELD OF THE INVENTION

The present invention relates to a keyboard, and more particularly to an illuminated keyboard.

BACKGROUND OF THE INVENTION

For preventing the light beam from being leaked out through a lateral surface of an illuminated keyboard, a reflecting plate and an upper wiring plate of the conventionally illuminated keyboard are usually adhered to each other. FIG. 1 is a schematic cross-sectional view illustrating a conventional illuminated keyboard. As shown in FIG. 1, the conventional illuminated keyboard 10 comprises a light source L, a key structure 11, and a backlight membrane switch module 12. The backlight membrane switch module 12 is disposed under the key structure 11. The light source L is located at a side of the backlight membrane switch module 12.

The backlight membrane switch module 12 comprises an upper wiring plate 13, a partition plate 14, a lower wiring plate 15, a light guide plate 16, and a reflecting plate 17. The upper wiring plate 13 comprises an upper circuit layer 131. The lower wiring plate 15 comprises a lower circuit layer 151. The partition plate 14 comprises a perforation 141. The partition plate 14 is arranged between the upper wiring plate 13 and the lower wiring plate 15 for separating the upper wiring plate 13 from the lower wiring plate 15. As the key structure 11 is depressed by the user, the upper circuit layer 131 of the upper wiring plate 13 is penetrated through the perforation 141 of the partition plate 14 and contacted with the lower circuit layer 151 of the lower wiring plate 15. Consequently, a key signal is correspondingly generated.

The light guide plate 16 is disposed under the lower wiring plate 15. Moreover, the light guide plate 16 is located at a side of the light source L for transferring the light beam. The reflecting plate 17 is disposed under the light guide plate 16 for reflecting the portion of the light beam that is outputted from the bottom of the light guide plate 16. Consequently, the light utilization of the light beam from the light source L is enhanced. The reflecting plate 17 is an opaque substrate, or the reflecting plate 17 is formed by coating an opaque material on a surface of a light-transmissible substrate.

For preventing the light beam which is transferred within the light guide plate 16 from being leaked out through a lateral surface of the light guide plate 16, an edge region of the upper wiring plate 13 and an edge region of the reflecting plate 17 of the conventional illuminated keyboard 10 are attached on each other. Since the lateral surface of the light guide plate 16 is enclosed by the reflecting plate 17, the light beam is prevented from being leaked out through the lateral surface of the light guide plate 16. Consequently, the problem of causing light leakage through the lateral surface of the light guide plate 16 will be eliminated.

However, since the edge region of the upper wiring plate 13 and the edge region of the reflecting plate 17 are attached each other, the overall volume of the conventional illuminated keyboard 10 is increased. For a small-sized keyboard (e.g. a keyboard of a notebook computer), since the inner space is insufficient or the position of the key structure is close to the edge region of the upper wiring plate 13, the distance between the edge region of the upper wiring plate 13 and the circuit layer printed on the upper wiring plate 13 is usually very small. Under this circumstance, the edge region of the upper wiring plate 13 and the edge region of the reflecting plate 17 of the conventional illuminated keyboard 10 fail to be successfully attached on each other. In other words, the conventional illuminated keyboard 10 still has the light leakage problem.

Therefore, there is a need of providing an improved illuminated keyboard in order to overcome the above drawbacks.

SUMMARY OF THE INVENTION

The present invention provides an illuminated keyboard for preventing the light beam from being leaked out through a lateral surface thereof.

In accordance with an aspect of the present invention, there is provided an illuminated keyboard. The illuminated keyboard includes a light source, a key structure, and a backlight membrane switch module. The light source is used for emitting a light beam. When the key structure is depressed, a key signal is correspondingly triggered. The backlight membrane switch module is disposed under the key structure for generating the key signal and transferring the light beam to the key structure. The backlight membrane switch module includes a light guide plate and a membrane switch circuit board. The light guide plate is located at a side of the light source for guiding the light beam, and includes a first circuit layer. The membrane switch circuit board is disposed over the light guide plate, and includes a light-shading part and a second circuit layer. The light-shading part is extended downwardly to a position under the light guide plate so as to prevent the light beam from being leaked out through a lateral surface of the light guide plate. When the key structure is depressed, the second circuit layer of the membrane switch circuit board and the first circuit layer of the light guide plate are contacted with each other, thereby generating the key signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
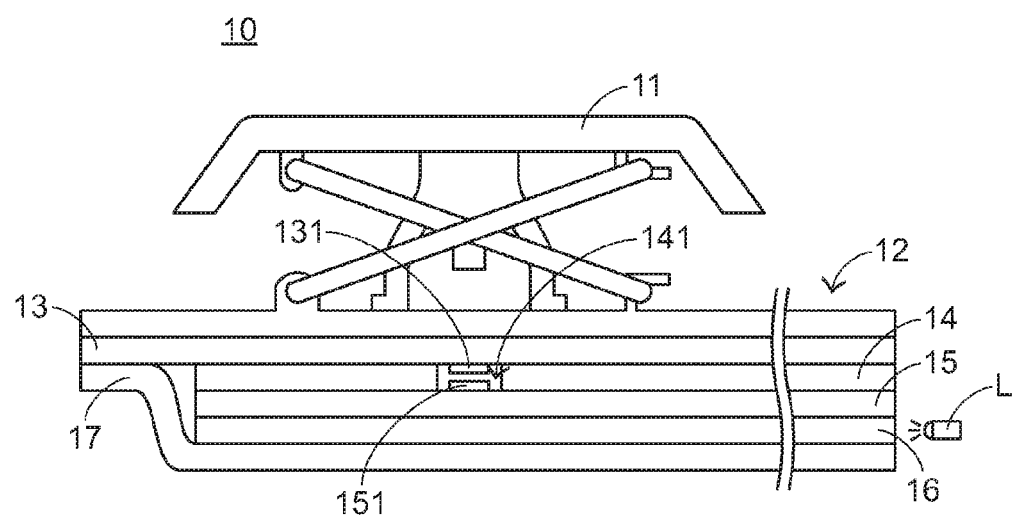
FIG. 1 is a schematic cross-sectional view illustrating a conventional illuminated keyboard.
Figure 2:
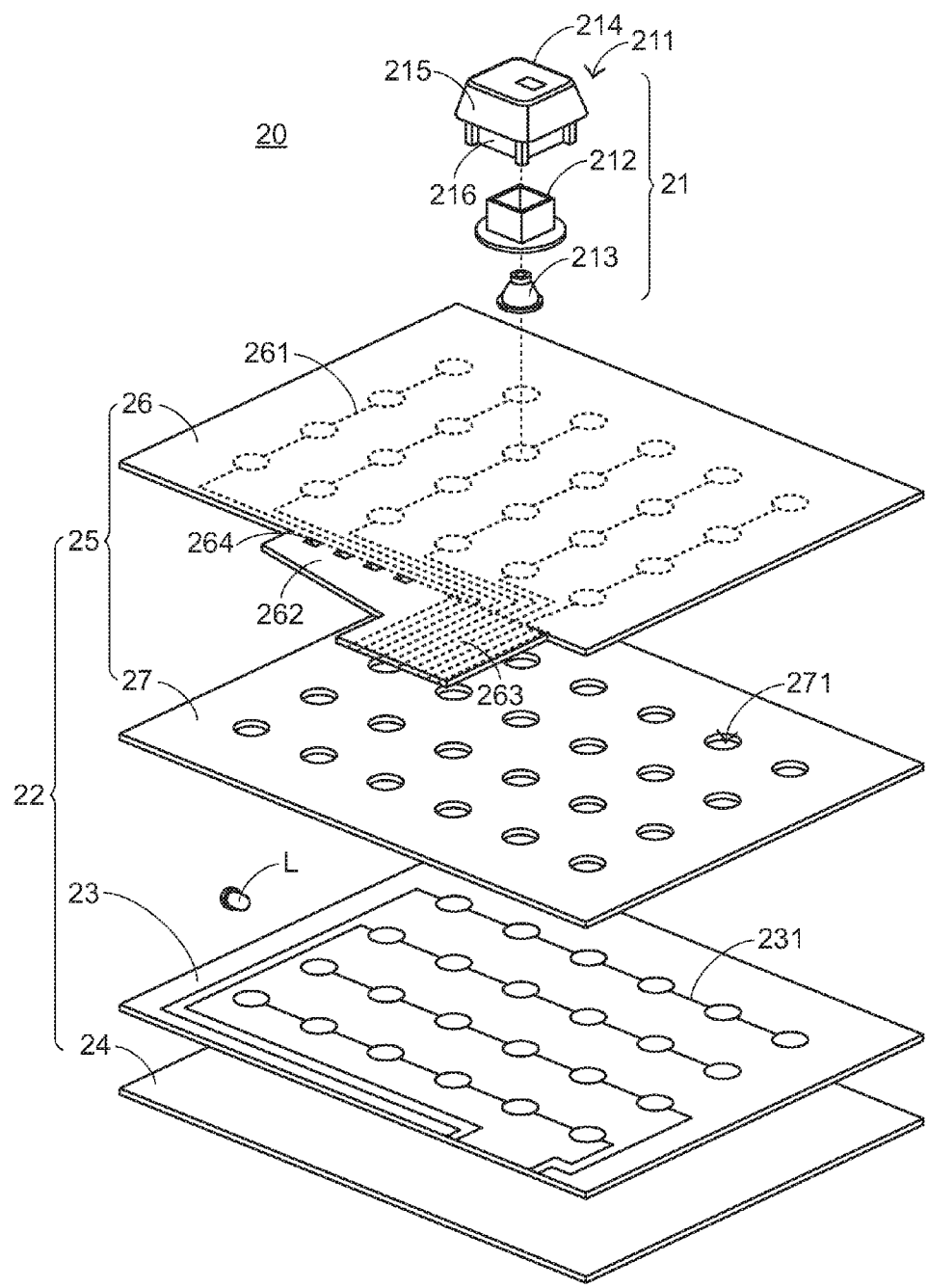
FIG. 2 is a schematic exploded view illustrating an illuminated keyboard according to a first embodiment of the present invention.

FIG. 2 is a schematic exploded view illustrating an illuminated keyboard according to a first embodiment of the present invention. As shown in FIG. 2, the illuminated keyboard 20 comprises a light source L, a key structure 21, and a backlight membrane switch module 22. The light source L is used for emitting a light beam. When the light beam is outputted from the key structure 21, even if the illuminated keyboard 20 is used in a dim environment, the user can easily identify the position of the key structure 21 and the representative function, the character or the symbol of the key structure 21. When the key structure 21 is depressed, a key signal is correspondingly generated. The backlight membrane switch module 22 is disposed under the key structure 21, and located at a side of the light source L for generating the key signal and allowing the light beam from the light source L to be transferred to the key structure 21. In this embodiment, the light source L comprises one or more light emitting diodes (LED) or any other light-emitting elements that are known in the art.

The key structure 21 may be a plunger key structure, a scissors key structure or any other key structure that is known in the art. In this embodiment, the key structure 21 is a plunger key structure. As shown in FIG. 2, the key structure 21 comprises a keycap 211, a key base 212, an elastic element 213, and a light-outputting part 214. The keycap 211 comprises a pressing part 215 and a plunger part 216.

The pressing part 215 is disposed on a top surface of the keycap 211 to be depressed by the user. The plunger part 216 is connected with the pressing part 215. In addition, the plunger part 216 and the pressing part 215 are linked with each other. The plunger part 216 is disposed within the key base 212, and the plunger part 216 is movable upwardly or downwardly relative to the key base 212. The elastic element 213 is disposed under the plunger part 216, and arranged between the plunger part 216 and the backlight membrane switch module 22. Moreover, the elastic element 213 is contacted with the backlight membrane switch module 22 for providing a restoring force. In response to the restoring force, the keycap 211 is returned to its original position.

The light-outputting part 214 is formed on the keycap 211 for outputting the light beam, thereby facilitating the user to identify the key structure 21. Moreover, the light-outputting part 214 may be a light-outputting number region, a light-outputting character region or a light-outputting symbol region. The method of forming the light-outputting part 214 is similar to the method of forming the light-outputting part of the conventional illuminated keyboard, and is not redundantly described herein.

Please refer to FIG. 2 again. The backlight membrane switch module 22 comprises a light guide plate 23, a reflecting plate 24, and a membrane switch circuit board 25. The light guide plate 23 comprises a first circuit layer 231. The first circuit layer 231 is formed on a top surface of the light guide plate 23. The light guide plate 23 is located at a side of the light source L for guiding the light beam that is emitted by the light source L. It is preferred that the light guide plate 23 is a light-transmissible substrate. Especially, the light guide plate 23 is made of a material with high reflectivity, low absorptivity and low emissivity to the light beam. The reflecting plate 24 is disposed under the light guide plate 23 for reflecting the portion of the light beam that is outputted from the bottom of the light guide plate 23. Consequently, the light utilization of the light beam from the light source L is enhanced. In an embodiment, the reflecting plate 24 is an opaque substrate, or the reflecting plate 24 is formed by coating an opaque material (e.g. a white ink) on a surface of a light-transmissible substrate. The light-transmissible substrate is made of glass, polycarbonate (PC), polyethylene terephthalate (PET), polymethylmethacrylate (PMMA) or any other light-transmissible material that is known in the art.

The membrane switch circuit board 25 is disposed over the light guide plate 23 for installing a second circuit layer 261 thereon and preventing the light beam from being leaked out through a lateral surface of the light guide plate 23. In this embodiment, the membrane switch circuit board 25 comprises a wiring plate 26 and a partition plate 27. The wiring plate 26 is located at the uppermost position of the backlight membrane switch module 22. The partition plate 27 is arranged between the wiring plate 26 and the light guide plate 23. In this embodiment, the wiring plate 26 and the partition plate 27 are light-transmissible substrates. The light-transmissible substrates are made of polycarbonate (PC), polyethylene terephthalate (PET), polymethylmethacrylate (PMMA) or any other light-transmissible material that is known in the art. Consequently, the light beam can be transmitted through the wiring plate 26 and the partition plate 27 and directed to the key structure 21. It is noted that the wiring plate 26 and the partition plate 27 are not limited to the light-transmissible substrates.

Figure 3:
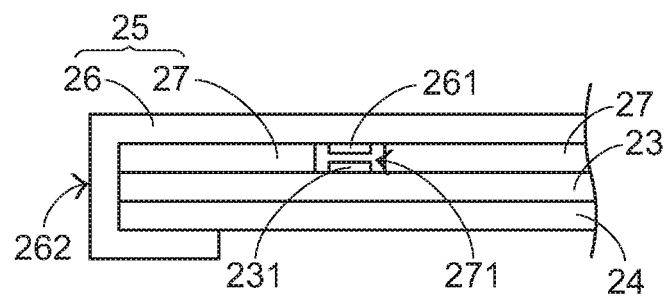
FIG. 3 is a schematic cross-sectional view illustrating the backlight membrane switch module of the illuminated keyboard according to the first embodiment of the present invention.

Please refer to FIGS. 2 and 3. FIG. 3 is a schematic cross-sectional view illustrating the backlight membrane switch module of the illuminated keyboard according to the first embodiment of the present invention. Firstly, as shown in FIG. 2, the partition plate 27 comprises plural perforations 271. The wiring plate 26 comprises a second circuit layer 261, a light-shading part 262, and a pin 263. The second circuit layer 261 is formed on a bottom surface of the wiring plate 26. The light-shading part 262 is connected to the wiring plate 26, and located at a side of the wiring plate 26. As shown in FIG. 3, the light-shading part 262 is bent downwardly to a position under the light guide plate 23 in order to enclose the lateral surface of the light guide plate 23. Due to the downwardly-bent light-shading part 262, the light beam transferred within the light guide plate 23 will not be leaked out through the lateral surface of the light guide plate 23. Consequently, the problem of causing light leakage will be eliminated. In this embodiment, the light-shading part 262 is also attached on a bottom surface of the reflecting plate 24, but is not limited thereto. Alternatively, in some other embodiments, the light-shading part 262 is attached on a bottom surface of the light guide plate 23.

Please refer to FIG. 2 again. The pin 263 is located at a side of the wiring plate 26, and electrically connected with the second circuit layer 261 of the wiring plate 26 and the first circuit layer 231 of the light guide plate 23 in order to be connected with a power source (not shown). In addition, the key signal is outputted from the pin 263. In this embodiment, the pin 263 and the light-shading part 262 are integrally formed with each other. Under this circumstance, the metallic terminals of the pin 263 are disposed on a bottom surface of the light-shading part 262. Alternatively, in some other embodiments, the pin 263 and the light-shading part 262 are separate flexible slabs.

As the key structure 21 is depressed by the user, the second circuit layer 261 of the wiring plate 26 is pushed by the depressed key structure 21 to be moved downwardly. Consequently, the second circuit layer 261 of the wiring plate 26 is penetrated through a corresponding perforation 271 of the partition plate 27 and contacted with the first circuit layer 231 of the light guide plate 23. Under this circumstance, the second circuit layer 261 and the first circuit layer 231 are electrically connected with each other to result in a corresponding key signal. Through the pin 263, the key signal is transmitted to an electronic device (e.g. a computer) that uses the illuminated keyboard 20.

In an embodiment, the light-shading part 262 is an opaque substrate, or the light-shading part 262 is formed by coating an opaque material on a surface of a light-transmissible substrate, wherein the light-transmissible substrate is made of polycarbonate (PC), polyethylene terephthalate (PET), polymethylmethacrylate (PMMA) or any other light-transmissible material that is known in the art. In case that the wiring plate 26 and the light-shading part 262 are made of the same material, the wiring plate 26 and the light-shading part 262 may be integrally formed with each other, but is not limited thereto.

For facilitating the light-shading part 262 to enclose the lateral surface of the light guide plate 23 and extend to the position under the light guide plate 23, plural openings 264 are formed on the junction zone between the wiring plate 26 and the light-shading part 262 (see FIG. 2). Due to the plural openings 264, the light-shading part 262 can be bent relative to the wiring plate 26 more easily. Consequently, the light-shading part 262 can be attached on the lateral surface of the light guide plate 23 more closely.

If the light beam is shaded by the first circuit layer 231 and the second circuit layer 261, the luminous efficacy of the illuminated keyboard 20 will be deteriorated. For enhancing the luminous efficacy, the second circuit layer 261 of the wiring plate 26 and the first circuit layer 231 of the light guide plate 23 may be made of a transparent conductive material. An example of the transparent conductive material includes but is not limited to indium tin oxide (ITO), nano silver, carbon nanotube or any other transparent conductive material that is known in the art. Moreover, the first circuit layer 231 and the second circuit layer 261 may be formed by a printing process, a spraying process or an electroplating process, but are not limited thereto.

Figure 4:
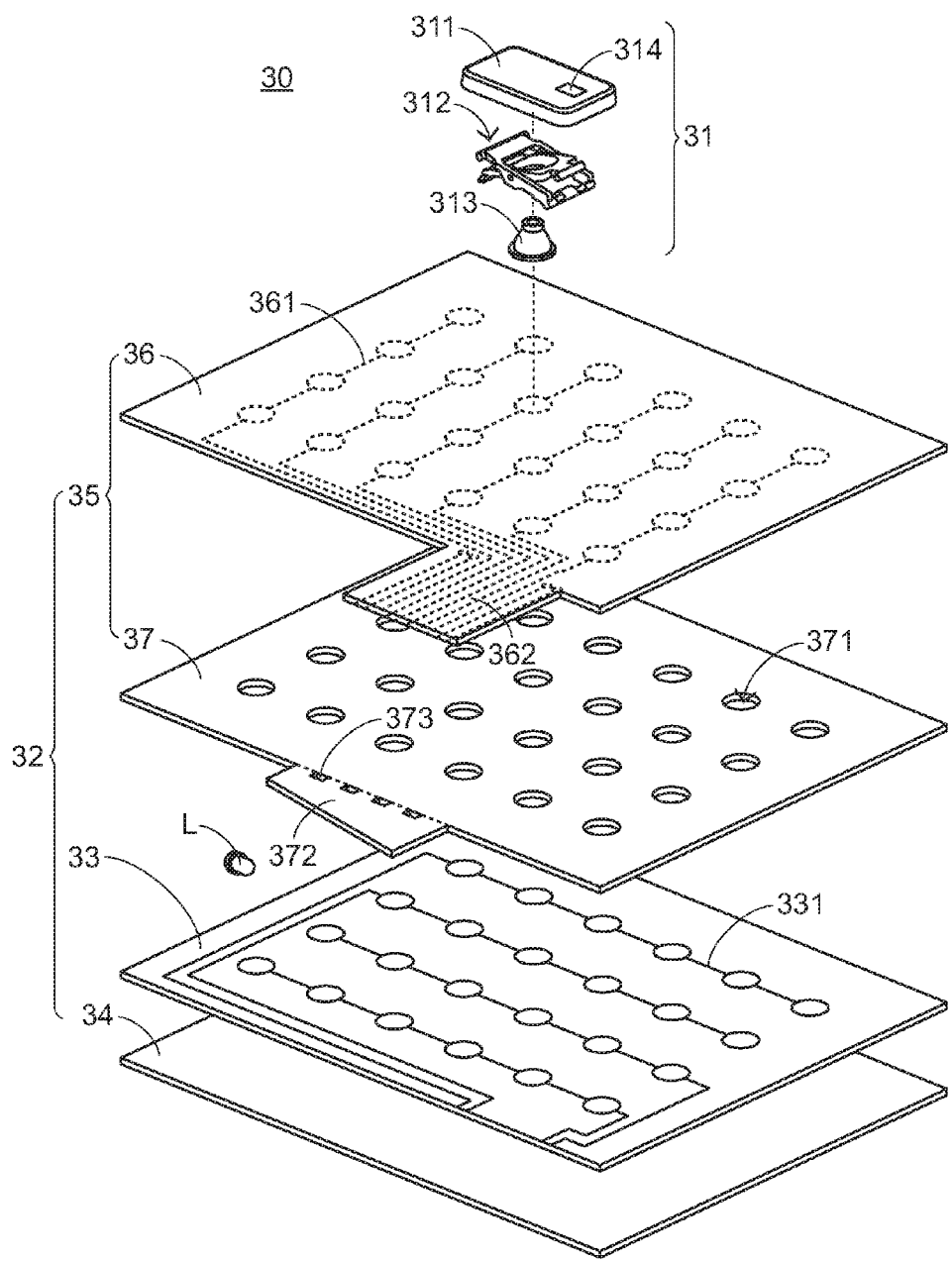
FIG. 4 is a schematic exploded view illustrating an illuminated keyboard according to a second embodiment of the present invention.

FIG. 4 is a schematic exploded view illustrating an illuminated keyboard according to a second embodiment of the present invention. In comparison with the illuminated keyboard of the first embodiment as shown in FIG. 2, the configuration of the key structure 31 and the position of the light-shading part of the illuminated keyboard 30 of this embodiment are distinguished. The structures of the illuminated keyboard 30 according to the second embodiment of the present invention will be illustrated in more details as follows.

As shown in FIG. 4, the illuminated keyboard 30 comprises a light source L, a key structure 31, and a backlight membrane switch module 32. The key structure 31 may be a plunger key structure, a scissors key structure or any other key structure that is known in the art. In this embodiment, the key structure 31 is a scissors key structure. The key structure 31 comprises a keycap 311, a scissors-type supporting structure 312, an elastic element 313, and a light-outputting part 314.

The scissors-type supporting structure 312 is disposed under the keycap 311 for supporting the keycap 311. The elastic element 313 is disposed under the keycap 311, and arranged between the keycap 311 and the backlight membrane switch module 32. Moreover, the elastic element 313 is contacted with the backlight membrane switch module 32 for providing a restoring force. In response to the restoring force, the keycap 311 is returned to its original position.

The light-outputting part 314 is formed on the keycap 311 for outputting the light beam, thereby facilitating the user to identify the key structure 31. Moreover, the light-outputting part 314 may be a light-outputting number region, a light-outputting character region or a light-outputting symbol region. The method of forming the light-outputting part 314 is similar to the method of forming the light-outputting part of the conventional illuminated keyboard, and is not redundantly described herein.

Please refer to FIG. 4 again. The backlight membrane switch module 32 comprises a light guide plate 33, a reflecting plate 34, and a membrane switch circuit board 35. The light guide plate 33 comprises a first circuit layer 331. The first circuit layer 331 is formed on a top surface of the light guide plate 33. The positions of the light guide plate 33 and the reflecting plate 34 are similar to those of the illuminated keyboard of the first embodiment, and are not redundantly described herein.

The membrane switch circuit board 35 is disposed over the light guide plate 33 for installing a second circuit layer 361 thereon and preventing the light beam from being leaked out through a lateral surface of the light guide plate 33. In this embodiment, the membrane switch circuit board 35 comprises a wiring plate 36 and a partition plate 37. The wiring plate 36 is located at the uppermost position of the backlight membrane switch module 32. The partition plate 37 is arranged between the wiring plate 36 and the light guide plate 33. In this embodiment, the wiring plate 36 and the partition plate 37 are light-transmissible substrates. The light-transmissible substrates are made of polycarbonate (PC), polyethylene terephthalate (PET), polymethylmethacrylate (PMMA) or any other light-transmissible material that is known in the art. Consequently, the light beam can be transmitted through the wiring plate 36 and the partition plate 37 and directed to the key structure 31. It is noted that the wiring plate 36 and the partition plate 37 are not limited to the light-transmissible substrates.

Figure 5:
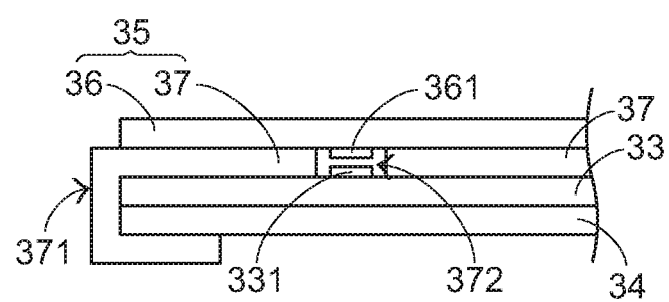
FIG. 5 is a schematic cross-sectional view illustrating the backlight membrane switch module of the illuminated keyboard according to the second embodiment of the present invention.

Please refer to FIGS. 4 and 5. FIG. 5 is a schematic cross-sectional view illustrating the backlight membrane switch module of the illuminated keyboard according to the second embodiment of the present invention. The wiring plate 36 comprises a second circuit layer 361 and a pin 362. The second circuit layer 361 is formed on a bottom surface of the wiring plate 36. The pin 362 is located at a side of the wiring plate 36, and electrically connected with the second circuit layer 361 of the wiring plate 36 and the first circuit layer 331 of the light guide plate 33 in order to be connected with a power source (not shown). In addition, the key signal is outputted from the pin 362. In this embodiment, the partition plate 37 comprises plural perforations 371 and a light-shading part 372.

The light-shading part 372 is connected to the partition plate 37, and located at a side of the partition plate 37. The light-shading part 372 is bent downwardly to a position under the light guide plate 33 in order to enclose the lateral surface of the light guide plate 33. Due to the downwardly-bent light-shading part 372, the light beam transferred within the light guide plate 33 will not be leaked out through the lateral surface of the light guide plate 33. Consequently, the problem of causing light leakage will be eliminated. In this embodiment, the light-shading part 372 is also attached on a bottom surface of the reflecting plate 34, but is not limited thereto.

As the key structure 31 is depressed by the user, the second circuit layer 361 of the wiring plate 36 is pushed by the depressed key structure 31 to be moved downwardly. Consequently, the second circuit layer 361 of the wiring plate 36 is penetrated through a corresponding perforation 371 of the partition plate 37 and contacted with the first circuit layer 331 of the light guide plate 33. Under this circumstance, the second circuit layer 361 and the first circuit layer 331 are electrically connected with each other to result in a corresponding key signal. Through the pin 362, the key signal is transmitted to an electronic device (e.g. a computer) that uses the illuminated keyboard 30.

In an embodiment, the light-shading part 372 is an opaque substrate, or the light-shading part 372 is formed by coating an opaque material on a surface of a light-transmissible substrate, wherein the light-transmissible substrate is made of polycarbonate (PC), polyethylene terephthalate (PET), polymethylmethacrylate (PMMA) or any other light-transmissible material that is known in the art. In case that the partition plate 37 and the light-shading part 372 are made of the same material, the partition plate 37 and the light-shading part 372 may be integrally formed with each other, but is not limited thereto.

For facilitating the light-shading part 372 to enclose the lateral surface of the light guide plate 33 and extend to the position under the light guide plate 33, plural openings 373 are formed on the junction zone between the partition plate 37 and the light-shading part 372 (see FIG. 4). Due to the plural openings 373, the light-shading part 372 can be bent relative to the partition plate 37 more easily. Consequently, the light-shading part 372 can be attached on the lateral surface of the light guide plate 33 more closely.

From the above descriptions, the present invention provides an illuminated keyboard. The illuminated keyboard comprises a light source, a key structure, and a backlight membrane switch module. The backlight membrane switch module comprises a light guide plate and a membrane switch circuit board. The light guide plate comprises a first circuit layer. The membrane switch circuit board is disposed over the light guide plate. Moreover, the membrane switch circuit board comprises a wiring plate, a partition plate, a light-shading part and a second circuit layer. The light-shading part is located at a side of the wiring plate or the partition plate, and bent downwardly to a position under the light guide plate in order to enclose a lateral surface of the light guide plate. Due to the downwardly-bent light-shading part, the light beam transferred within the light guide plate will not be leaked out through the lateral surface of the light guide plate. Consequently, the problem of causing light leakage will be eliminated. Moreover, since the light-shading part is bent downwardly to the position under the light guide plate, the volume of the illuminated keyboard is not largely increased. In other words, the arrangement of the light-shading part is not obviously restricted by the limited inner space of the illuminated keyboard. Moreover, even if the second circuit layer of the wiring plate is very close to the edge region of the wiring plate, the wiring plate can be still connected to the wiring plate or the partition plate. Consequently, the lateral surface of the light guide plate can be enclosed by the extension part, and the problem of causing light leakage will be eliminated.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An illuminated keyboard, comprising:
   a light source for emitting a light beam;
   a key structure, wherein when said key structure is depressed, a key signal is correspondingly triggered; and
   a backlight membrane switch module disposed under said key structure for generating said key signal and transferring said light beam to said key structure, wherein said backlight membrane switch module comprises:
      a light guide plate located at a side of said light source for guiding said light beam, and comprising a first circuit layer; and
      a membrane switch circuit board disposed over said light guide plate, and comprising a light-shading part and a second circuit layer, wherein said light-shading part is extended downwardly to a position under said light guide plate so as to prevent said light beam from being leaked out through a lateral surface of said light guide plate, wherein when said key structure is depressed, said second circuit layer of said membrane switch circuit board and said first circuit layer of said light guide plate are contacted with each other, thereby generating said key signal.

2. The illuminated keyboard according to claim 1, wherein said membrane switch circuit board further comprises a pin, wherein said pin is disposed on said light-shading part, and electrically connected with said first circuit layer and said second circuit layer.

3. The illuminated keyboard according to claim 1, wherein said light-shading part is an opaque substrate, or said light-shading part is a light-transmissible substrate coated with an opaque material.

4. The illuminated keyboard according to claim 1, wherein said backlight membrane switch module further comprises a reflecting plate, wherein said reflecting plate is disposed under said light guide plate for reflecting said light beam.

5. The illuminated keyboard according to claim 1, wherein said first circuit layer and said second circuit layer are formed by a printing process, a spraying process or an electroplating process.

6. The illuminated keyboard according to claim 1, wherein each of said first circuit layer and said second circuit layer is made of a transparent conductive material.

7. The illuminated keyboard according to claim 1, wherein said membrane switch circuit board further comprises a wiring plate and a partition plate, wherein said second circuit layer is disposed on said wiring plate, and said light-shading part is connected with said wiring plate, wherein said wiring plate and said partition plate are light-transmissible substrates, said partition plate comprises plural perforations, and said light-shading part and said wiring plate are integrally formed with each other.

8. The illuminated keyboard according to claim 1, wherein said membrane switch circuit board further comprises a wiring plate and a partition plate, wherein said second circuit layer is disposed on said wiring plate, and said light-shading part is connected with said partition plate, wherein said wiring plate and said partition plate are light-transmissible substrates, said partition plate comprises plural perforations, and said light-shading part and said partition plate are integrally formed with each other.

9. The illuminated keyboard according to claim 1, wherein said key structure comprises:
   a keycap comprising a pressing part and a plunger part;
   a light-outputting part for allowing said light beam to go through;
   a key base for placing said plunger part of said keycap thereon; and
   an elastic element disposed under said plunger part and contacted with said backlight membrane switch module for allowing said keycap to be returned to an original position.

10. The illuminated keyboard according to claim 1, wherein said key structure comprises:
   a keycap;
   a light-outputting part for allowing said light beam to go through;
   a scissors-type supporting structure for supporting said keycap; and
   an elastic element disposed under said plunger part and contacted with said backlight membrane switch module for allowing said keycap to be returned to an original position.

* * * * *